US012609529B2

(12) United States Patent (10) Patent No.: US 12,609,529 B2

Sun et al. (45) Date of Patent: Apr. 21, 2026

(54) PHOTOVOLTAIC POWER GENERATION SYSTEM CONTROL METHOD, PHOTOVOLTAIC POWER GENERATION SYSTEM, AND SWITCHING APPARATUS

(71) Applicant: Huawei Digital Power Technologies Co., Ltd., Shenzhen (CN)

(72) Inventors: Longting Sun, Shanghai (CN); Tiansan Lin, Shenzhen (CN); Bo Yu, Shanghai (CN); Yongbing Gao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 18/507,622

(22) Filed: Nov. 13, 2023

(65) Prior Publication Data

US 2024/0079882 A1 Mar. 7, 2024

Related U.S. Application Data

(63) Continuation of application No. PCT/CN2021/093932, filed on May 14, 2021.

(51) Int. Cl.
*H02J 1/08* (2006.01)
*H02J 3/007* (2026.01)
(Continued)

(52) U.S. Cl.
CPC ............ *H02J 1/084* (2020.01); *H02J 3/0075* (2020.01); *H02J 3/38* (2013.01); *H02M 1/0048* (2021.05); *H02M 1/007* (2021.05); *H02J 2300/24* (2020.01)

(58) Field of Classification Search
CPC .......... H02J 3/0075; H02J 1/0084; H02J 3/38; H02M 1/007; H02M 1/0048
See application file for complete search history.

(56) References Cited

U.S. PATENT DOCUMENTS 6,800,964 B2* 10/2004 Beck ........................ H02J 3/46
307/80
2010/0109442 A1* 5/2010 Vega Betoret .......... H02J 3/466
307/82
(Continued)

FOREIGN PATENT DOCUMENTS

CN 103219749 A 7/2013
CN 107979115 A 5/2018
(Continued)

OTHER PUBLICATIONS

Machine translation of CN108565884 by Clarivate Analytics, Aug. 2025, 7 pages.*

(Continued)

*Primary Examiner* — Harry R Behm
(74) *Attorney, Agent, or Firm* — Conley Rose, P.C.

(57) ABSTRACT

A switching apparatus includes a switching unit, a detection unit, and a controller. The switching unit includes a first output end, a second output end, a first input end connected to each first DC/DC converter in a one-to-one correspondence, and a second input end connected to each second DC/DC converter in a one-to-one correspondence. The first output end is connected to an input end of a first DC/AC converter, and the second output end is connected to an input end of a second DC/AC converter. The detection unit is separately connected to the first DC/AC converter, the second DC/AC converter, a plurality of first DC/DC converters, and a plurality of second DC/DC converters.

20 Claims, 8 Drawing Sheets

(51) Int. Cl.
    *H02J 3/38*         (2006.01)
    *H02M 1/00*       (2006.01)

(56)           References Cited

U.S. PATENT DOCUMENTS

2012/0080955 A1 *   4/2012   Fishman ................. H02J 3/381
                                            307/82
2019/0027617 A1 *   1/2019   Varlan ................... H10F 77/955

FOREIGN PATENT DOCUMENTS

CN         108565884   A   *   9/2018      ........... H02J 3/385
CN         109861274   A       6/2019
CN         110350581   A     10/2019
JP      2002073184   A   *   3/2002

OTHER PUBLICATIONS

Machine translation of JP 2002073184 by Clarivate Analytics, Aug. 2025, 7 pages.*

* cited by examiner

PHOTOVOLTAIC POWER GENERATION SYSTEM CONTROL METHOD, PHOTOVOLTAIC POWER GENERATION SYSTEM, AND SWITCHING APPARATUS

CROSS-REFERENCE TO RELATED APPLICATIONS

This is a continuation of International Patent Application No. PCT/CN2021/093932 filed on May 14, 2021, the disclosure of which is hereby incorporated by reference in its entirety.

TECHNICAL FIELD

This application relates to the field of photovoltaic power generation technologies, and in particular, to a photovoltaic power generation system control method, a photovoltaic power generation system, and a switching apparatus.

BACKGROUND

With the exhaustion of traditional energy, renewable energy power generation has attracted more attention. Power generation apparatuses that convert renewable energy such as optical energy and wind energy into electric energy have been gradually applied in a large scale. A photovoltaic power generation system is used as an example. A typical photovoltaic power generation system at least includes a photovoltaic module, a direct current/direct current (DC/DC) converter, and a direct current/alternating current (DC/AC) converter.

To further improve power of the photovoltaic power generation system and reduce costs, the conventional technology provides a new photovoltaic power generation system structure. As shown in FIG. 1, the photovoltaic power generation system includes a plurality of photovoltaic modules, DC/DC converters that are connected to the photovoltaic modules in a one-to-one correspondence, a first DC/AC converter, a second DC/AC converter, and a grid-connected inverter. When the photovoltaic power generation system is used, the plurality of photovoltaic modules in the photovoltaic power generation system are evenly divided into a first part of photovoltaic modules and a second part of photovoltaic modules. Electric energy generated by the first part of photovoltaic modules may be converted by the first DC/AC converter and then output by the grid-connected inverter, and electric energy generated by the second part of photovoltaic modules may be converted by the second DC/AC converter and then output by the grid-connected inverter, that is, an input end of the first DC/AC converter is connected in series to an input end of the second DC/AC converter, and an output end of the first DC/AC converter is connected in parallel to an output end of the second DC/AC converter. Because the input ends of the first DC/AC converter and the second DC/AC converter are connected in series, in this case, a voltage of a direct current bus connected to the first DC/AC converter is a sum of an output voltage of the first DC/AC converter and an input voltage of the second DC/AC converter, thereby effectively increasing a voltage value of the direct current bus, and reducing a current and a loss in a rated working state. However, in the foregoing photovoltaic power generation system architecture, losses of components in the system in different running states are not proportional. When the system works under a light load of the system or input power of DC/AC converters is unbalanced, an overall loss of the photovoltaic power generation system is still relatively high.

In view of this, how to improve efficiency of the photovoltaic power generation system in each running state becomes a design difficulty of the photovoltaic power generation system.

SUMMARY

This application provides a photovoltaic power generation system control method, a photovoltaic power generation system, and a switching apparatus, to reduce component losses of the photovoltaic power generation system in various running states, and improve efficiency of the photovoltaic power generation system.

According to a first aspect, this application provides a switching apparatus. The switching apparatus may be applied to a photovoltaic power generation system. The photovoltaic system includes a plurality of first photovoltaic modules, a plurality of second photovoltaic modules, first direct current/direct current DC/DC converters connected to the plurality of first photovoltaic modules in a one-to-one correspondence, second DC/DC converters connected to the plurality of second photovoltaic modules in a one-to-one correspondence, a first direct current/alternating current DC/AC converter, a second DC/AC converter, and the switching apparatus. An input end of the first DC/AC converter is connected in series to an input end of the second DC/AC converter through a neutral point.

Specifically, the switching apparatus may include a switching unit, a detection unit, and a controller.

The switching unit includes a first output end, a second output end, a first input end connected to each first DC/DC converter in a one-to-one correspondence, and a second input end connected to each second DC/DC converter in a one-to-one correspondence. The first output end of the switching unit is connected to the first DC/AC converter, the second output end of the switching unit is connected to the second DC/AC converter; and the switching unit is configured to control a connection between each first DC/DC converter and the first DC/AC converter, and control a connection between each second DC/DC converter and the second DC/AC converter. The detection unit is separately connected to the first DC/AC converter, the second DC/AC converter, each first DC/DC converter, and each second DC/DC converter, and the detection unit is configured to detect electrical signals of the first DC/AC converter, the second DC/AC converter, the plurality of first DC/DC converters, and the plurality of second DC/DC converters, and output the electrical signals to the controller. The controller is separately connected to the detection unit and the switching unit, and the controller is configured to determine, based on the electrical signal detected by the detection unit, a switching solution for reducing a component loss of the photovoltaic power generation system, and control the switching unit to perform the switching solution.

The controller with the foregoing apparatus structure may determine a current running state of the photovoltaic power generation system based on the electrical signal detected by the detection unit, determine, based on the current running state of the photovoltaic power generation system, the switching solution for reducing the component loss of the photovoltaic power generation system, and control the switching unit to perform the switching solution, to improve efficiency of the photovoltaic power generation system.

In a possible design, the switching unit includes a plurality of switches.

The plurality of switches is separately connected between the first DC/DC converter and the first DC/AC converter, and connected between the second DC/DC converter and the second DC/AC converter. The controller is connected to the plurality of switches, and the controller controls working states of different switches in the plurality of switches to perform the switching solution.

The controller with the foregoing apparatus structure may control a connection between the DC/DC converter and the DC/AC converter by controlling a working state of each of the plurality of switches of the switching unit, to perform the switching solution.

In a possible design, the plurality of switches include: a first switch that is in a one-to-one correspondence with each first input end of the switching unit, a second switch that is in a one-to-one correspondence with each first input end of the switching unit, a third switch that is in a one-to-one correspondence with each second input end of the switching unit, and a fourth switch that is in a one-to-one correspondence with each second input end of the switching unit.

An input end of each first switch is connected to a first endpoint of a corresponding first input end, and an output end of each first switch is connected to a first endpoint of the input end of the first DC/AC converter. An input end of each second switch is connected to a second endpoint of a corresponding first input end, and an output end of each second switch is connected to a second endpoint of the input end of the first DC/AC converter. An input end of each third switch is connected to a first endpoint of a corresponding second input end, and an output end of each third switch is connected to a first endpoint of the input end of the second DC/AC converter. An input end of each fourth switch is connected to a second endpoint of a corresponding second input end, and an output end of each fourth switch is connected to a second endpoint of the input end of the second DC/AC converter. The output end of each second switch is connected in series to the output end of each third switch through the neutral point.

According to the foregoing switching apparatus, the first switch and the second switch corresponding to each first input end may be used to control the connection between each first DC/DC converter and the first DC/AC converter, and the third switch and the fourth switch corresponding to each second input end may be used to control the connection between each second DC/DC converter and the second DC/AC converter.

In a possible design, the plurality of switches further include: a fifth switch that is in a one-to-one correspondence with each first input end of the switching unit, a sixth switch that is in a one-to-one correspondence with each first input end of the switching unit, a seventh switch that is in a one-to-one correspondence with each second input end of the switching unit, and an eighth switch that is in a one-to-one correspondence with each second input end of the switching unit.

An input end of each fifth switch is connected to a first endpoint of a corresponding first input end, and an output end of each fifth switch is connected to the first endpoint of the input end of the second DC/AC converter. An input end of each sixth switch is connected to a second endpoint of a corresponding first input end, and an output end of each sixth switch is connected to the second endpoint of the input end of the second DC/AC converter. An input end of each seventh switch is connected to a first endpoint of a corresponding second output end, and an output end of each seventh switch is connected to the first endpoint of the input end of the first DC/AC converter. An input end of each eighth switch is connected to a second endpoint of a corresponding second input end, and an output end of each eighth switch is connected to the second endpoint of the input end of the first DC/AC converter. The output end of each sixth switch is connected in series to the output end of each seventh switch through the neutral point.

In the structure of the switching unit, the switching unit is further configured to control a connection between each first DC/DC converter and the second DC/AC converter, and control a connection between each second DC/DC converter and the first DC/AC converter.

According to the foregoing switching apparatus, the fifth switch and the sixth switch corresponding to each first input end may be used to control the connection between each first DC/DC converter and the second DC/AC converter, and the seventh switch and the eighth switch corresponding to each second input end may be used to control the connection between each second DC/DC converter and the first DC/AC converter.

In a possible design, the plurality of switches include: a first single-pole double-throw switch that is in a one-to-one correspondence with each first input end of the switching unit, a second single-pole double-throw switch that is in a one-to-one correspondence with each first input end of the switching unit, a third single-pole double-throw switch that is in a one-to-one correspondence with each second input end of the switching unit, and a fourth single-pole double-throw switch that is in a one-to-one correspondence with each second input end of the switching unit.

An input end of each first single-pole double-throw switch is connected to a corresponding first input end, a first output end of each first single-pole double-throw switch is connected to a first endpoint of the input end of the first DC/AC converter, and a second output end of each first single-pole double-throw switch is connected to a first endpoint of the input end of the second DC/AC converter. An input end of each second single-pole double-throw switch is connected to a corresponding first input end, a second input end of each second single-pole double-throw switch is connected to a second endpoint of the input end of the first DC/AC converter, and a second output end of each second single-pole double-throw switch is connected to a second endpoint of the input end of the second DC/AC converter. An input end of each third single-pole double-throw switch is connected to a corresponding second input end, a first output end of each third single-pole double-throw switch is connected to the first endpoint of the input end of the second DC/AC converter, and a second output end of each third single-pole double-throw switch is connected to the first endpoint of the input end of the first DC/AC converter. An input end of each fourth single-pole double-throw switch is connected to a corresponding second input end, a first output end of each fourth single-pole double-throw switch is connected to the second endpoint of the input end of the second DC/AC converter, and a second output end of each fourth single-pole double-throw switch is connected to the second endpoint of the input end of the first DC/AC converter. The input end of each second single-pole double-throw switch is connected to a corresponding second input end, a first output end of each second single-pole double-throw switch is connected to the second DC/AC converter, and the second output end of each second single-pole double-throw switch is connected to the first DC/AC converter. The first output end of each second single-pole double-throw switch is separately connected in series to the second output end of each first single-pole double-throw switch and the second output end of each fourth single-pole double-throw switch through the neutral point, and the second output end of each third single-pole double-throw switch is separately connected in series to the second output end of the fourth single-pole double-throw switch and the second output end of each first single-pole double-throw switch through the neutral point.

In the structure of the switching unit, the switching unit is further configured to control a connection between each first DC/DC converter and the second DC/AC converter, and control a connection between each second DC/DC converter and the first DC/AC converter.

According to the foregoing switching apparatus, the first single-pole double-throw switch and the second single-pole double-throw switch corresponding to each first input end may be used to control the connection between each first DC/DC converter and the first DC/AC converter or the second DC/AC converter, and the third single-pole double-throw switch and the fourth single-pole double-throw switch corresponding to each second input end may be used to control the connection between each second DC/DC converter and the first DC/AC converter or the second DC/AC converter.

In a possible design, the switching apparatus further includes a first one-way switch connected between the first output end of the switching unit and the first DC/AC converter and a second one-way switch connected between the second output end of the switching unit and the second DC/AC converter.

The controller is further connected to each first DC/DC converter and each second DC/DC converter, and the controller is further configured to, when it is determined that a difference between an output voltage of each first DC/DC converter or an output voltage of each second DC/DC converter and a preset voltage threshold is greater than a preset voltage difference threshold, adjust the output voltage of each first DC/DC converter and/or the output voltage of each second DC/DC converter.

According to the foregoing switching apparatus, a smooth connection between the connected DC/DC converter and the DC/AC converter may be implemented by using the one-way switch between the DC/DC converter and the DC/AC converter.

In a possible design, the controller is specifically configured to calculate input power of the first DC/AC converter and input power of the second DC/AC converter based on the electrical signal detected by the detection unit; when it is determined that the input power of the first DC/AC converter and/or the input power of the second DC/AC converter are/is less than a first preset power threshold, determine that the switching solution is calculating a first difference between input power of a first target DC/AC converter and the first preset power threshold, where the first target DC/AC converter is a DC/AC converter whose input power is less than the preset power threshold; and disconnect, based on the first difference and a second preset power threshold, a first part of the DC/DC converter connected to the target DC/AC converter.

According to the foregoing switching apparatus, the controller may determine, based on the electrical signal detected by the detection unit, whether the photovoltaic power generation system is in a light load running state. When it is determined that the photovoltaic power generation system is in the light load running state, the switching solution is set to control disconnection of some DC/DC converters and DC/AC converters, to reduce a quantity of DC/DC converters connected to the photovoltaic power generation system. In this case, output power of the connected DC/DC converter may also meet a power requirement of a load connected to the photovoltaic power generation system, so that an unnecessary component loss is reduced.

In a possible design, the controller is specifically configured to, when it is determined that a second difference between an absolute value of an input voltage of the first DC/AC converter and an absolute value of an input voltage of the second DC/AC converter exceeds a preset threshold, and an absolute value of an input voltage of a second target DC/AC converter exceeds a preset voltage interval, determine that the switching solution is disconnecting the second target DC/AC converter from the DC/DC converter.

According to the foregoing apparatus, when the system is unbalanced and a working voltage of the second target DC/AC converter exceeds a rated voltage interval (the preset voltage interval), it may be determined that the second target DC/AC converter or the DC/DC converter connected to the second target DC/AC converter is faulty. To ensure safe running of the system, the switching solution may be set to disconnect the second target DC/AC converter from the DC/DC converter.

In a possible design, the controller is specifically configured to, when it is determined that the second difference between the absolute value of the input voltage of the first DC/AC converter and the absolute value of the input voltage of the second DC/AC converter exceeds the preset threshold, and both the absolute value of the input voltage of the first DC/AC converter and the absolute value of the input voltage of the second DC/AC converter are within the preset voltage interval, if the absolute value of the input voltage of the first DC/AC converter is greater than the absolute value of the input voltage of the second DC/AC converter, determine that the switching solution is controlling a second part of a plurality of DC/DC converters connected to the first DC/AC converter to be connected to the second DC/AC converter; or if the absolute value of the input voltage of the first DC/AC converter is less than the absolute value of the input voltage of the second DC/AC converter, determine that the switching solution is controlling a second part of a plurality of DC/DC converters connected to the second DC/AC converter to be connected to the input end of the first DC/AC converter in the photovoltaic power generation system.

According to the foregoing switching apparatus, when determining that a difference between input voltages of two DC/AC converters is relatively large, the controller may determine that direct current buses connected to two DC/AC input ends are extremely unbalanced. To balance input and output voltages and currents of the DC/DC and DC/AC converters, the switching solution may be set to transfer a part of the DC/DC converter connected to the DC/AC converter with an excessively high input voltage to the DC/AC converter with a low input voltage.

In a possible design, the controller is specifically configured to calculate input electrical signals and output electrical signals of each first DC/DC converter and each second DC/DC converter based on the electrical signal detected by the detection unit; and when it is determined that a difference between a value of an input electrical signal and a value of an output electrical signal of a first target DC/DC converter is greater than the second preset power threshold, determine that the switching solution is disconnecting the first target DC/DC converter from the first DC/DC converter and the second DC/AC converter.

According to the foregoing switching apparatus, if the difference between the input electrical signal and the output electrical signal of the first target DC/DC converter is relatively large, it may be determined that a loss value of the first DC/DC converter is greater than a loss value in a normal case, and the switching solution may be set to cut off the connection between the first target DC/DC converter and the DC/AC converter, to reduce a component loss of the photovoltaic power generation system.

In a possible design, the controller is specifically configured to, when it is determined that an input electrical signal or an output electrical signal of a second target DC/DC converter exceeds a preset interval, determine that the switching solution is disconnecting the second target DC/DC converter from the first DC/DC converter and the second DC/AC converter.

According to the foregoing switching apparatus, when the photovoltaic module or the DC/DC converter is faulty, and therefore cause an input signal of the DC/DC converter to be excessively low, or an output signal of the DC/DC converter to be excessively low, the switching solution may be set to disconnect the faulty DC/DC converter from the DC/AC converter.

In a possible design, the controller is specifically configured to, when it is determined that a sum of output power of the connected first DC/DC converter and the second DC/DC converter is less than or equal to a target threshold, determine that the switching solution is controlling the connected DC/DC converters to be connected to the first DC/AC converter or the second DC/AC converter. The target threshold is rated power of the first DC/AC converter.

According to the foregoing switching apparatus, when output power of the currently connected DC/DC converter can be converted by a single DC/AC converter, to reduce an unnecessary component loss, the switching solution may be set to connect all the currently connected DC/DC converters to one DC/AC converter.

In a possible design, the controller is further configured to determine, based on the electrical signal detected by the detection unit, that a third target DC/AC converter is faulty; and determine that the switching solution is disconnecting the third target DC/AC converter from the DC/DC converter.

In a possible design, the controller is specifically configured to determine, based on the electrical signal detected by the detection unit, that a third target DC/AC converter is faulty; and determine that the switching solution is connecting the DC/DC converter connected to the third target DC/AC converter to another DC/AC converter in the photovoltaic power generation system.

According to a second aspect, an embodiment of this application provides a photovoltaic power generation system. The photovoltaic power generation system includes a plurality of first photovoltaic modules, a plurality of second photovoltaic modules, a first DC/DC converter that is in a one-to-one correspondence with each first photovoltaic module, a second DC/DC converter that is in a one-to-one correspondence with each second photovoltaic module, a first DC/AC converter, a second DC/AC converter, and the switching apparatus provided in the first aspect and any possible design of embodiments of this application.

The first photovoltaic module is connected to a corresponding first DC/DC converter; the second photovoltaic module is connected to a corresponding second DC/DC converter; the first DC/DC converter and each second DC/DC converter are connected to the switching apparatus; and the switching apparatus is separately connected to the first DC/AC converter and the second DC/AC converter.

By using the photovoltaic power generation system, the switching apparatus may determine a current running state of the photovoltaic power generation system based on a detected electrical signal, determine, based on the current running state of the photovoltaic power generation system, a switching solution for reducing a component loss of the photovoltaic power generation system, and perform the switching solution by controlling a connection between the DC/DC converter and the DC/AC converter, to reduce a component loss of the photovoltaic power generation system.

According to a third aspect, an embodiment of this application provides a photovoltaic power generation system control method. The control method may be applied to a photovoltaic power generation system. The photovoltaic power generation system includes a plurality of first photovoltaic modules, a plurality of second photovoltaic modules, first direct current/direct current DC/DC converters connected to the plurality of first photovoltaic modules in a one-to-one correspondence, second DC/DC converters connected to the plurality of second photovoltaic modules in a one-to-one correspondence, a first direct current/alternating current DC/AC converter, a second DC/AC converter, and a switching apparatus. An input end of the first DC/AC converter is connected in series to an input end of the second DC/AC converter through a neutral point. The control method specifically includes the following steps of detecting electrical signals of the first DC/AC converter, the second DC/AC converter, each first DC/DC converter, and each second DC/DC; and determining, based on the detected electrical signal, a switching solution for reducing a component loss of the photovoltaic power generation system, where the switching solution is used to control a connection between each of the first DC/DC converter and the second DC/DC converter and the first DC/AC converter or the second DC/AC converter.

According to the foregoing method, a current running state (a light load or whether a faulty component exists in the system) of the photovoltaic power generation system is determined based on the detected electrical signal, the switching solution for reducing the component loss of the photovoltaic power generation system is determined based on the current running state of the photovoltaic power generation system, and a connection between each DC/DC converter and each DC/AC converter is controlled, to implement the foregoing switching solution, thereby reducing a component loss of the photovoltaic power generation system and improving efficiency of the photovoltaic power generation system.

In a possible design, the determining, based on the detected electrical signal, a switching solution for reducing a component loss of the photovoltaic power generation system includes: calculating input power of the first DC/AC converter and input power of the second DC/AC converter; when it is determined that the input power of the first DC/AC converter and/or the input power of the second DC/AC converter are/is less than a first preset power threshold, determining that the switching solution is calculating a first difference between input power of a first target DC/AC converter and the first preset power threshold, where the first target DC/AC converter is a DC/AC converter whose input power is less than the first preset power threshold; and disconnecting, based on the first difference and a second preset power threshold, a first part of the DC/DC converter connected to the target DC/AC converter.

According to the foregoing method, whether the photovoltaic power generation system is in a light load state may be determined based on the detected electrical signal. When it is determined that the photovoltaic power generation system is in the light load state, the switching solution is set to control connections between some DC/DC converters and the DC/AC converters. In this case, output power of the connected DC/DC converters in the system can meet a power requirement of a load connected to the photovoltaic power generation system, thereby reducing an unnecessary component loss.

In a possible design, the determining, based on the detected electrical signal, a switching solution for reducing a component loss of the photovoltaic power generation system includes: when it is determined that a second difference between an absolute value of an input voltage of the first DC/AC converter and an absolute value of an input voltage of the second DC/AC converter exceeds a preset threshold, and an absolute value of an input voltage of a second target DC/AC converter exceeds a preset voltage interval, determining that the switching solution is disconnecting the second target DC/AC converter from the DC/DC converter.

According to the foregoing method, when the system is unbalanced and a working voltage of the second target DC/AC converter exceeds a rated voltage interval (the preset voltage interval), it may be determined that the second target DC/AC converter or the DC/DC converter connected to the second target DC/AC converter is faulty. To ensure normal running of the system, the switching solution may be set to cut off the connection between the second DC/AC converter and the DC/DC converter.

In a possible design, the determining, based on the detected electrical signal, a switching solution for reducing a component loss of the photovoltaic power generation system includes: when it is determined that the second difference between the absolute value of the input voltage of the first DC/AC converter and the absolute value of the input voltage of the second DC/AC converter exceeds the preset threshold, and both the absolute value of the input voltage of the first DC/AC converter and the absolute value of the input voltage of the second DC/AC converter are within the preset voltage interval, if the absolute value of the input voltage of the first DC/AC converter is greater than the absolute value of the input voltage of the second DC/AC converter, determining that the switching solution is controlling a second part of a plurality of DC/DC converters connected to the first DC/AC converter to be connected to the second DC/AC converter; or if the absolute value of the input voltage of the first DC/AC converter is less than the absolute value of the input voltage of the second DC/AC converter, determining that the switching solution is controlling a second part of a plurality of DC/DC converters connected to the second DC/AC converter to be connected to the input end of the first DC/AC converter.

According to the foregoing method, when it is determined that a difference between input voltages of two DC/AC converters is relatively large, it may be determined that direct current buses connected to two DC/AC input ends are extremely unbalanced. To balance input and output voltages and currents of the DC/DC and DC/AC converters, the switching solution may be set to transfer a part of the DC/DC converter connected to the DC/AC converter with an excessively high input voltage to the DC/AC converter with a low input voltage.

In a possible design, the determining, based on the detected electrical signal, a switching solution for reducing a component loss of the photovoltaic power generation system includes: calculating input electrical signals and output electrical signals of each first DC/DC converter and each second DC/DC converter; and when it is determined that a difference between a value of an input electrical signal and a value of an output electrical signal of a first target DC/DC converter is greater than the first preset power threshold, determining that the switching solution is disconnecting the first target DC/DC converter from the first DC/DC converter and the second DC/AC converter.

According to the foregoing method, when it is determined that a difference between an input electrical signal and an output electrical signal of a single DC/DC converter is relatively large, it may be determined that a loss value of the DC/DC converter is greater than a loss value in a normal case. To reduce a component loss of the photovoltaic power generation system, the DC/DC converter may be disconnected from the DC/AC converter.

In a possible design, the determining, based on the detected electrical signal, a switching solution for reducing a component loss of the photovoltaic power generation system includes: when it is determined that an input electrical signal or an output electrical signal of a second target DC/DC converter exceeds a preset interval, determining that the switching solution is disconnecting the second target DC/DC converter from the first DC/DC converter and the second DC/AC converter.

According to the foregoing method, when it is determined that the electrical signal and the output electrical signal of the DC/DC converter exceed the preset interval, it may be determined that the DC/DC converter is faulty or the photovoltaic module connected to the DC/DC converter is faulty. To reduce a loss of the photovoltaic power generation system and ensure normal running of a component connected to back end of the DC/DC converter, the switching solution may be set to disconnect the DC/DC converter from the DC/AC converter.

In a possible design, the determining, based on the detected electrical signal, a switching solution for reducing a component loss of the photovoltaic power generation system includes: when it is determined that a sum of output power of the connected first DC/DC converter and the second DC/DC converter is less than or equal to a target threshold, determining that the switching solution is controlling the connected DC/DC converter to be connected to the first DC/AC converter or the second DC/AC converter. The target threshold is rated power of the first DC/AC converter or the second DC/AC converter.

According to the foregoing method, when output power of the currently connected DC/DC converter can be converted by a single DC/AC converter, to reduce an unnecessary component loss, all the currently connected DC/DC converters may be connected to one DC/AC converter.

In a possible design, the determining, based on the detected electrical signals, a switching solution for reducing a component loss of the photovoltaic power generation system includes: determining, based on the electrical signal detected by a detection unit, that a third target DC/AC converter is faulty; and determining that the switching solution is disconnecting the third target DC/AC converter from the DC/DC converter.

In a possible design, the determining, based on the detected electrical signals, a switching solution for reducing a component loss of the photovoltaic power generation system includes: determining, based on the electrical signal detected by a detection unit, that a third target DC/AC converter is faulty; and determining that the switching solution is connecting the DC/DC converter connected to the third target DC/AC converter to another DC/AC converter in the photovoltaic power generation system.

DESCRIPTION OF EMBODIMENTS

The following describes in detail embodiments of this application with reference to accompanying drawings.

A specific operation method in a method embodiment may also be applied to an apparatus embodiment or a system embodiment. It should be noted that in description of this application, "at least one" means one or more, and "a plurality of" means two or more. In view of this, in embodiments of the present disclosure, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/", unless otherwise specified, generally indicates an "or" relationship between the associated objects. In addition, it should be understood that in description of this application, terms such as "first" and "second" are merely used for distinguishing and description, but should not be understood as indicating or implying relative importance, or should not be understood as indicating or implying a sequence.

It should be noted that a "connection" in embodiments of this application refers to an electric connection, and a connection between two electrical elements may be a direct or indirect connection between the two electrical elements. For example, a connection between A and B may represent that A is directly connected to B, or A is indirectly connected to B by using one or more other electrical elements. For example, the connection between A and B may also represent that A is directly connected to C, C is directly connected to B, and A is connected to B through C.

It should be noted that a switch in embodiments of this application may be one or more of a plurality of types of switching components such as a relay, a metal-oxide-semiconductor field-effect transistor (MOSFET), a bipolar junction transistor (BJT), an insulated-gate bipolar transistor (IGBT), and a silicon carbide (SiC) power transistor. Details are not enumerated in embodiments of this application. Each switch component may include an input end, an output end, and a control end. The control end is configured to control the switch component to be closed or opened. When the switch component is closed, a current may be transmitted between the input end and the output end of the switch component. When the switch component is opened, a current cannot be transmitted between the input end and the output end of the switch component. An MOSFET is used as an example. A control end of a switch component is a gate electrode, an input end of the switch component may be a source electrode of the switch component, and an output end may be a drain electrode of the switch component. Alternatively, the input end may be a drain electrode of the switch component, and the output end may be a source electrode of the switch component.

Figure 1:
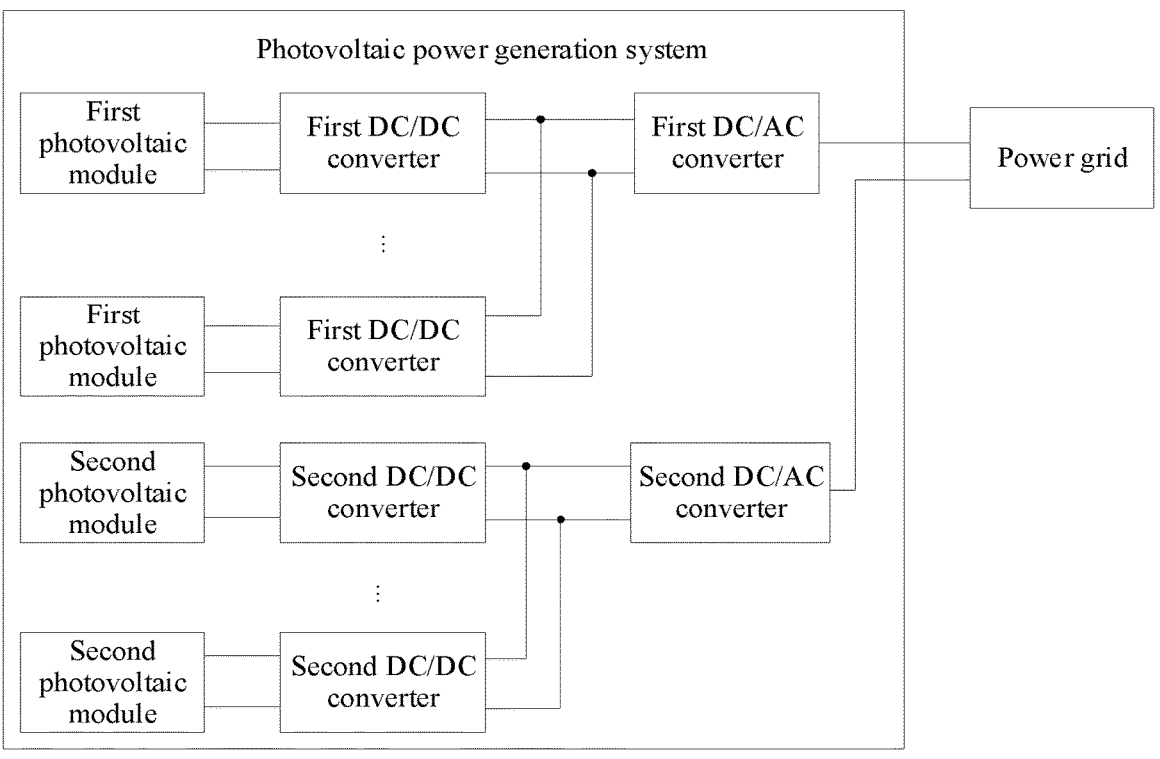
FIG. 1 is a schematic diagram 1 of a structure of a photovoltaic power generation system according to an embodiment of this application.

A switching apparatus provided in an embodiment of this application may be applied to a photovoltaic power generation system. FIG. 1 is a schematic diagram of a possible structure of the photovoltaic power generation system. Refer to FIG. 1. The photovoltaic power generation system includes a plurality of first photovoltaic modules, a plurality of second photovoltaic modules, a first DC/DC converter that is in a one-to-one correspondence with the first photovoltaic module, a second DC/DC converter that is in a one-to-one correspondence with the second photovoltaic module, a first DC/AC converter, and a second DC/AC converter.

An output end of each first photovoltaic module is connected to an input end of a corresponding first DC/DC converter, an output end of each second photovoltaic module is connected to an input end of a corresponding second DC/DC converter, an output end of each first DC/DC converter is connected to an input end of the first DC/AC converter, an output end of each second DC/DC converter is connected to an input end of the second DC/AC converter, and both an output end of the first DC/AC converter and an output end of the second DC/AC converter are connected to a power grid.

Currently, to reduce a loss of the photovoltaic module in the photovoltaic power generation system on a transmission cable, the input end of the first DC/AC converter is connected in series to the input end of the second DC/AC converter through a neutral point (N), to increase an input voltage of the DC/AC converter, thereby reducing a component loss in a process of transmitting electric energy from the DC/DC converter to the DC/AC converter.

In actual use, although the connection manner of the photovoltaic power generation system can reduce a loss of the photovoltaic power generation system, loss values of the photovoltaic power generation system in various running states are not proportional. When the system works under a light load of the system or input power of DC/AC converters is unbalanced, an overall loss of the photovoltaic power generation system is still relatively high.

Figure 2:
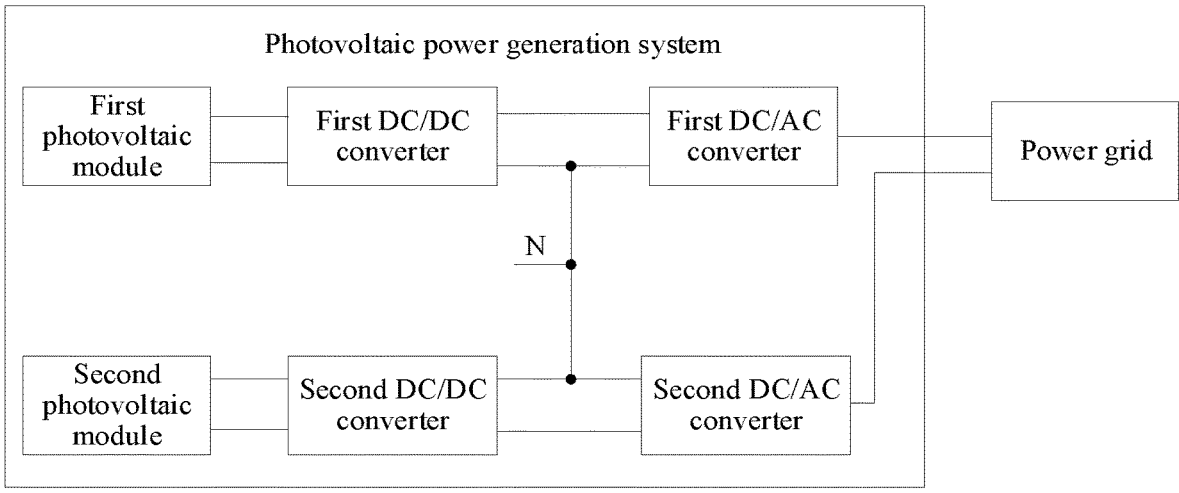
FIG. 2 is a schematic diagram 2 of a structure of a photovoltaic power generation system according to an embodiment of this application.

In view of this, this application provides a photovoltaic power generation system control method and a switching apparatus, which may be applied to a photovoltaic power generation system shown in FIG. 2, to reduce losses of the photovoltaic power generation system in various running states, and improve efficiency of the photovoltaic power generation system.

Figure 3:
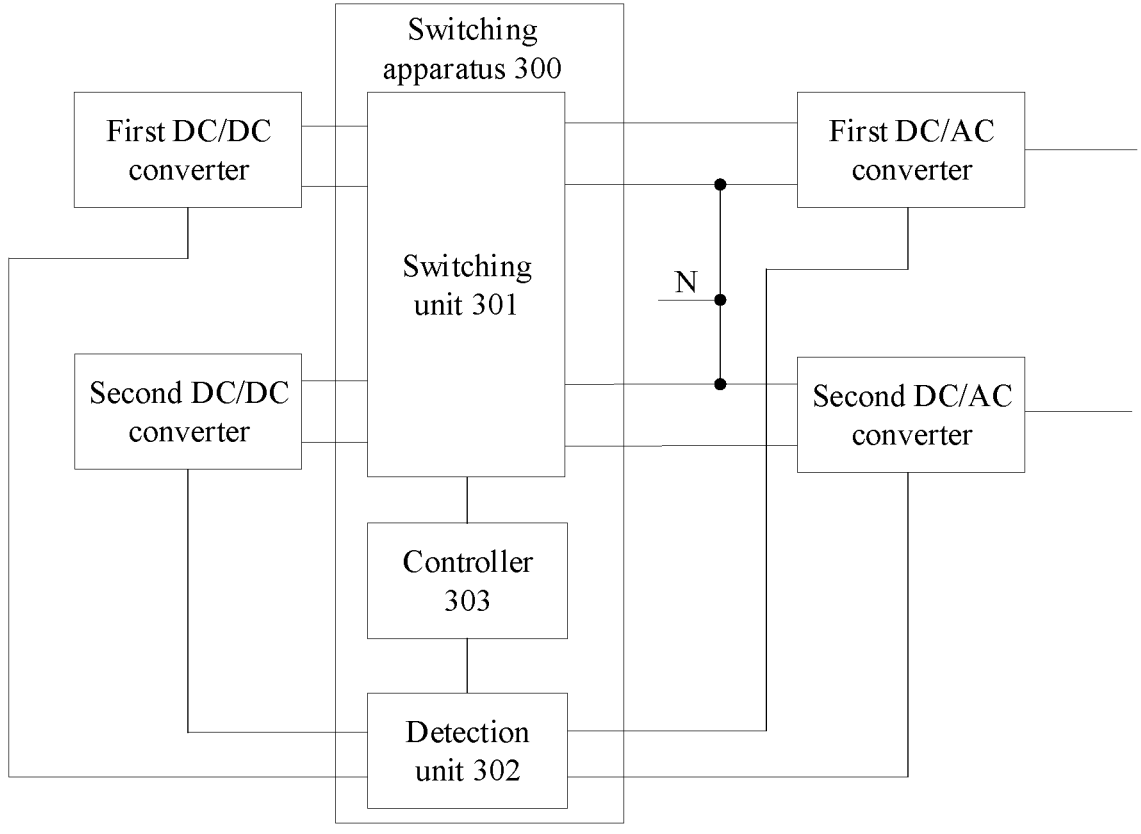
FIG. 3 is a schematic diagram of a structure of a switching apparatus according to an embodiment of this application.

FIG. 3 is a schematic diagram of a structure of a switching apparatus according to an embodiment of this application. As shown in FIG. 3, the switching apparatus 300 mainly includes a switching unit 301, a detection unit 302, and a controller 303.

The switching unit 301 includes a first output end, a second output end, a first input end connected to each first DC/DC converter in a one-to-one correspondence, and a second input end connected to each second DC/DC converter in a one-to-one correspondence. The first output end of the switching unit 301 is connected to an input end of a first DC/AC converter, the second output end of the switching unit 301 is connected to an input end of a second DC/AC converter, and the switching unit 301 is configured to control a connection between each first DC/DC converter and the first DC/AC converter, and control a connection between each second DC/DC converter and the second DC/AC converter. The detection unit 302 is separately connected to the first DC/AC converter, the second DC/AC converter, a plurality of first DC/DC converters, and a plurality of second DC/DC converters, and the detection unit 302 is configured to detect electrical signals of the first DC/AC converter, the second DC/AC converter, the plurality of first DC/DC converters, and the plurality second DC/DC converters, and output the electrical signals to the controller 303. The controller 303 is separately connected to the detection unit 302 and the switching unit 301; and the controller 303 is configured to determine, based on the electrical signal detected by the detection unit 302, a switching solution for reducing a component loss of the photovoltaic power generation system, and control the switching unit 301 to perform the switching solution, to reduce a component loss of the photovoltaic power generation system.

In this embodiment of this application, the switching apparatus 300 may control a connection between the first DC/DC converter and the first DC/AC converter, and control the connection between the second DC/DC converter and the second DC/AC converter. A direct current output by the first DC/DC converter may be converted into an alternating current by using the connected first DC/AC converter, and a direct current output by the second DC/DC converter may be converted into an alternating current by using the connected second DC/AC converter.

The switching apparatus 300 provided in this embodiment of this application can reduce a component loss of the photovoltaic power generation system. For example, it is assumed that when some DC/DC converters or photovoltaic modules connected to the DC/DC converters in the photovoltaic power generation system are faulty, the controller 303 may determine, based on the detected electrical signal, a faulty component, and disconnect the faulty DC/DC converter from the DC/AC converter, to reduce a component loss in the photovoltaic power generation system and improve efficiency of the photovoltaic power generation system.

In a possible implementation, the controller 303 may further control a working state of the switching unit 301, to control the connection between the first DC/DC converter and the second DC/AC converter, and control the connection between the second DC/DC converter and the first DC/AC converter.

When the foregoing switching apparatus 300 is used to control the connection between the DC/DC converter and the DC/AC converter in the photovoltaic power generation system, the controller 303 may control the working state of the switching unit 301, to control the switching unit 301 to perform the switching solution, to control a connection between the DC/DC converter and the DC/AC converter.

During specific implementation, the switching unit 301 may include a plurality of switch components. The controller 303 adjusts the working state of the switching unit 301 by adjusting working states of these switch components, to control a connection between each DC/DC converter and the DC/AC converter.

In actual use, if the plurality of switch components in the switching unit 301 are MOSFETs, the controller 303 may be connected to a gate electrode of the MOSFET, to control the connection between the first DC/DC converter and the first DC/AC converter and control the connection between the second DC/DC converter and the second DC/AC converter by controlling connection and disconnection of the MOSFET. If a switching transistor in the switching unit 301 is a BJT, the controller 303 may be connected to a base of the BJT, to control the connection between the first DC/DC converter and the first DC/AC converter and control the connection between the second DC/DC converter and the second DC/AC converter by controlling connection and disconnection of the BJT.

During specific implementation, the controller 303 may be any one of a micro controller unit (MCU), a central processing unit (CPU), or a digital signal processor (DSP). Certainly, a specific form of the controller 303 is not limited to the foregoing examples.

This embodiment of this application provides the switching apparatus 300, the controller 303 determines a current running state of the photovoltaic power generation system based on the electrical signal detected by the detection unit 302, determines, based on the current running state of the photovoltaic power generation system, the switching solution for reducing the component loss of the photovoltaic power generation system, and performs the switching solution by using the switching unit 301 configured to control the connection between the DC/DC converter and the DC/AC converter.

With reference to embodiments, the following further describes, by using examples, a process in which the controller 303 determines the switching solution in various running states of the photovoltaic power generation system in this embodiment of this application.

Running State 1

In a current connection manner of the photovoltaic power generation system, the controller 303 obtains the electrical signal detected by the detection unit 302, and the controller 303 calculates input power of the first DC/AC converter and input power of the second DC/AC converter based on the electrical signals obtained by the detection unit 302; and when determining that the input power of the first DC/AC converter and/or the input power of the second DC/AC converter are/is less than a second preset power threshold, determines that the photovoltaic power generation system is lightly loaded.

According to the switching apparatus 300 provided in this embodiment of this application, when the photovoltaic power generation system is in the light load state, the switching solution is: calculating a first difference between input power of a first target DC/AC converter and a preset power threshold; and disconnecting, based on the first difference and the second preset power threshold, a first part of the DC/DC converter connected to the first target DC/AC converter. The first target DC/AC converter is a DC/AC converter whose input power is less than a first preset power threshold. The second preset power threshold may be rated power of the first DC/AC converter or the second DC/AC converter.

Specifically, the controller 303 sends a control signal to a switch component connected to the first part of the DC/DC converter, and the switch component cannot receive the control signal, and therefore disconnects the first target DC/DC converter from the first part of the connected DC/DC converter.

A quantity of DC/DC converters included in the first part is a ratio of the first difference to output power of the DC/DC converter.

Running State 2

In a current connection state of the photovoltaic power generation system, when determining that a second difference between an absolute value of an input voltage of the first DC/AC converter and an absolute value of an input voltage of the second DC/AC converter exceeds a preset threshold, and an absolute value of an input voltage of a second target DC/AC converter exceeds a preset voltage interval, the controller 303 determines that the input voltages of the first DC/AC converter and the second DC/AC converter are unbalanced.

In a possible implementation, when the absolute value of the input voltage of the second target DC/AC converter exceeds the preset voltage interval, it is determined that the second target DC/AC converter or the DC/DC converter connected to the second target DC/AC converter is faulty. In this case, the switching solution is disconnecting the second target DC/AC converter from the DC/DC converter.

In a possible implementation, when both the absolute value of the input voltage of the first DC/AC converter and the absolute value of the input voltage of the second DC/AC converter are within the preset voltage interval, if the absolute value of the input voltage of the first DC/AC converter is greater than the absolute value of the input voltage of the second DC/AC converter, the switching solution is controlling a second part of a plurality of DC/DC converters connected to the first DC/AC converter to be connected to the second DC/AC converter; or if the absolute value of the input voltage of the first DC/AC converter is less than the absolute value of the input voltage of the second DC/AC converter, the switching solution is controlling a second part of a plurality of DC/DC converters connected to the second DC/AC converter to be connected to the input end of the first DC/AC converter in the photovoltaic power generation system.

Running State 3

In a current connection state of the photovoltaic power generation system, the controller 303 receives the detected electrical signal transmitted by the detection unit 302, and the controller 303 calculates input electrical signals and output electrical signals of each first DC/DC converter and each second DC/DC converter based on the electrical signals detected by the detection unit 302. When it is determined that a difference between a value of the input electrical signal and a value of the output electrical signal of the first target DC/DC converter is greater than a first preset power threshold, it is determined that a loss value of a first target DC/DC converter exceeds a loss value of the DC/DC converter in a normal state. To reduce a component loss of the photovoltaic power generation system, the switching solution is disconnecting the first target DC/DC converter from the first DC/DC converter and the second DC/AC converter.

Running State 4

In a current connection manner of the photovoltaic power generation system, the controller 303 receives the electrical signal detected by the detection unit 302. When determining that an input electrical signal or an output electrical signal of a second target DC/DC converter exceeds a preset interval, the controller 303 determines that the second target DC/DC converter or a photovoltaic module connected to the second target DC/DC converter is faulty. To reduce a component loss of the photovoltaic power generation system, the switching solution is disconnecting the second target DC/DC converter from the first DC/DC converter and the second DC/AC converter.

Running State 5

In a current connection manner of the photovoltaic power generation system, the controller 303 receives the electrical signal detected by the detection unit 302. When determining that a sum of output power of the connected first DC/DC converter and the second DC/DC converter is less than or equal to a target threshold, the controller 303 may determine that all the currently connected DC/DC converters can perform conversion by using one DC/AC converter. The target threshold is rated power of the first DC/AC converter or the second DC/AC converter and the second DC/AC converter.

Specifically, to reduce a component loss of the photovoltaic power generation system, the switching solution is controlling all the connected DC/DC converters to be connected to the first DC/AC converter or the second DC/AC converter.

Running State 6

When the controller 303 determines, based on the electrical signal detected by the detection unit 302, that a third target DC/AC converter is faulty, to reduce a component loss of the photovoltaic power generation system, the switching solution is disconnecting the third target DC/AC converter from the DC/DC converter.

In a possible implementation, when the controller 303 determines that the third target DC/AC converter is faulty, the switching solution is connecting the DC/DC converter connected to the third target DC/AC converter to another DC/AC converter in the photovoltaic power generation system.

It should be noted that, the manners of determining the switching solution by the controller 303 in the running state of the photovoltaic power generation system provided in the foregoing several embodiments may be used in a superimposed manner.

In this embodiment of this application, the switching unit 301 configured to perform the switching solution has the plurality of switches. The plurality of switches is separately connected between the first DC/DC converter and the first DC/AC converter, and is connected between the second DC/DC converter and the second DC/AC converter. The controller 303 is connected to the plurality of switches, and the controller 303 controls working states of different switches in the plurality of switches to perform the switching solution.

In actual use, the switching unit 301 has a plurality of possible implementation structures. Next, in this embodiment of this application, a structure of the switching unit 301 provided in this embodiment of this application is further described by using the following example.

For ease of explanation, the following uses one first DC/DC converter and one second DC/DC converter in the photovoltaic power generation system as an example for description.

Example 1 of the Switching Unit 301

Figure 4:
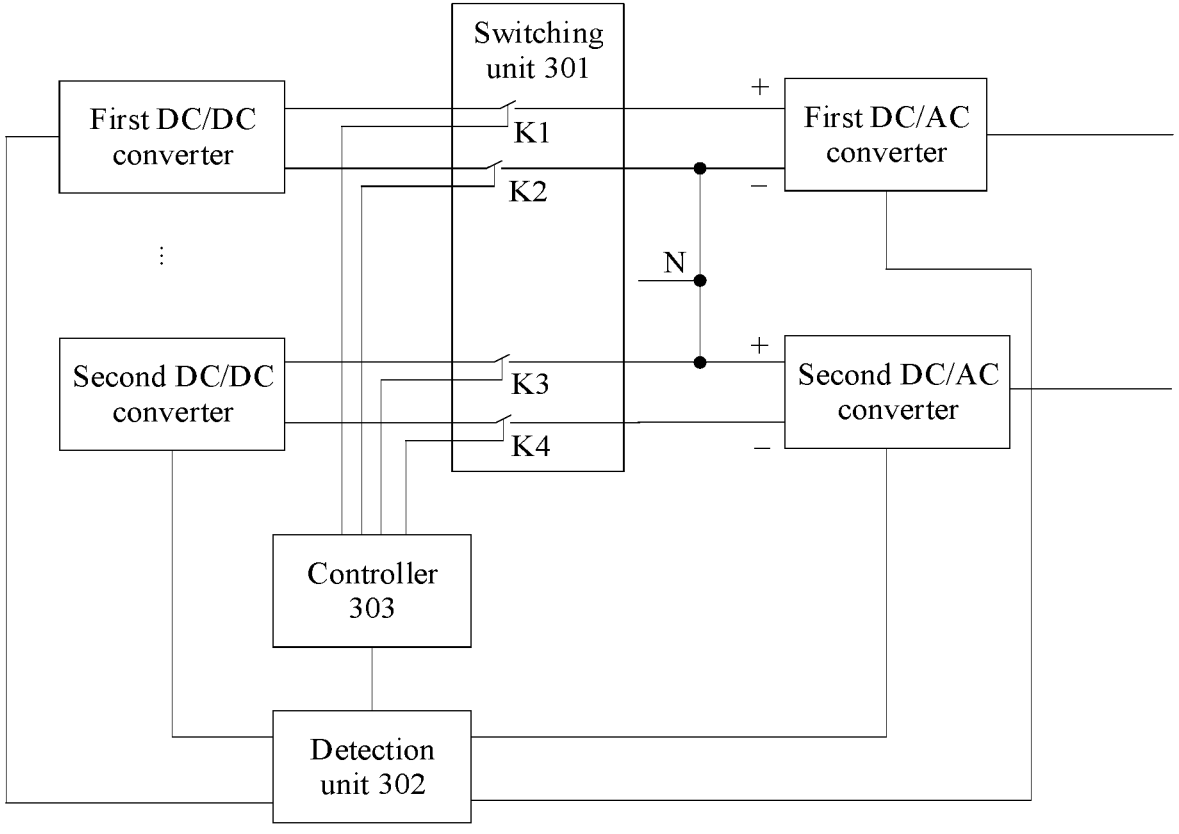
FIG. 4 is a schematic diagram 1 of a structure of a switching unit according to an embodiment of this application.

In the switching apparatus 300 provided in this embodiment of this application, as shown in FIG. 4, the plurality of switches in the switching unit 301 include: a first plurality of switches K1 that is in a one-to-one correspondence with each first input end of the switching unit 301, a second plurality of switches K2 that is in a one-to-one correspondence with each first input end of the switching unit 301, a third plurality of switches K3 that is in a one-to-one correspondence with each second input end of the switching unit 301, and a fourth plurality of switches K4 that is in a one-to-one correspondence with each second input end of the switching unit 301.

An input end of each first switch K1 is connected to a first endpoint of a corresponding first input end, an output end of each first switch K1 is connected to a first endpoint of the input end of the first DC/AC converter. An input end of each second switch K2 is connected to a second endpoint of a corresponding first input end, and an output end of each second switch K2 is connected to a second endpoint of the input end of the first DC/AC converter. An input end of each third switch K3 is connected to a first endpoint of a corresponding second input end, and an output end of each third switch K3 is connected to a first endpoint of the input end of the second DC/AC converter. An input end of each fourth switch K4 is connected to a second endpoint of a corresponding second input end, and an output end of each fourth switch K4 is connected to a second endpoint of the input end of the second DC/AC converter. The output end of each second switch K2 is connected in series to the output end of each third switch K3 through the neutral point N. Control ends of the first switch K1, the second switch K2, the third switch K3, and the fourth switch K4 are all connected to the controller 303.

It should be understood that two endpoints of the first input end and the second input end are respectively an end that outputs a high potential of the DC/DC converter and an end that outputs a low potential.

A function of setting the first switch K1 and the second switch K2 corresponding to each first input end is: controlling the connection between each first DC/DC converter and the first DC/AC converter; and a function of setting the third switch K3 and the fourth switch K4 that are in a one-to-one correspondence with each second input end is: controlling the connection between each second DC/DC converter and the second DC/AC converter.

During specific implementation, the controller 303 may control, by closing the first switch K1 and the second switch K2, the first DC/DC converter connected to the first switch K1 and the second switch K2 to be connected to the first DC/AC converter, and may control, by controlling to close the third switch K3 and the fourth switch K4, a connection to the second DC/AC converter connected to the third switch and the fourth switch K4.

Figure 5:
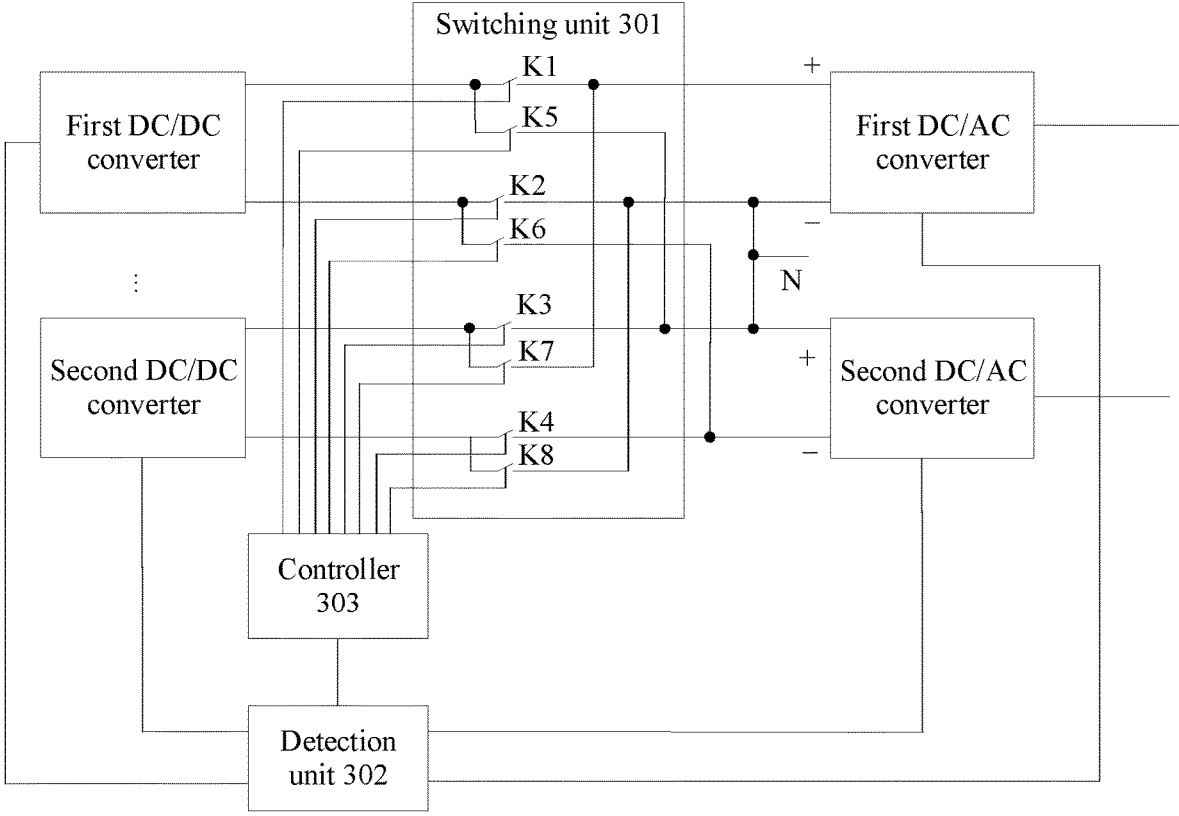
FIG. 5 is a schematic diagram 2 of a structure of a switching unit according to an embodiment of this application.

In a possible implementation, as shown in FIG. 5, the plurality of switches in the switching unit 301 may further include: a fifth plurality of switches K5 that is in a one-to-one correspondence with each first input end of the switching unit 301, a sixth plurality of switches K6 that is in a one-to-one correspondence with each first input end of the switching unit 301, a seventh plurality of switches K7 that is in a one-to-one correspondence with each second input end of the switching unit 301, and an eighth plurality of switches K8 that is in a one-to-one correspondence with each second input end of the switching unit 301.

An input end of each fifth switch K5 is connected to a first endpoint of a corresponding first input end, and an output end of each fifth switch K5 is connected to the first endpoint of the input end of the second DC/AC converter. An input end of each sixth switch K6 is connected to a second endpoint of a corresponding first input end, and an output end of each sixth switch K6 is connected to the second endpoint of the input end of the second DC/AC converter.

An input end of each seventh switch K7 is connected to a first endpoint of a corresponding second output end, and an output end of each seventh switch K7 is connected to the first endpoint of the input end of the first DC/AC converter. An input end of each eighth switch K8 is connected to a second endpoint of a corresponding second input end, and an output end of each eighth switch K8 is connected to the second endpoint of the input end of the first DC/AC converter. The output end of each sixth switch K6 is connected in series to the output end of each seventh switch K7 through the neutral point.

A function of setting the fifth switch K5 and the sixth switch K6 that are in a one-to-one correspondence with each first input end is: controlling a connection between each first DC/DC converter and the second DC/AC converter; and a function of setting the seventh switch K7 and the eighth switch K8 that are in a one-to-one correspondence with each second input end is to control a connection between each second DC/DC converter and the first DC/AC converter.

During specific implementation, the controller 303 may control, by closing the fifth switch K5 and the sixth switch K6, the first DC/DC converter connected to the fifth switch K5 and the sixth switch K65 to be connected to the second DC/AC converter, and may control, by controlling to close the seventh switch K7 and the eighth switch K8, a connection to the first DC/AC converter connected to the seventh switch K7 and the eighth switch K8.

In actual use, to avoid impact on a component caused by inconsistency between an output voltage of the DC/DC converter and an input voltage of the DC/AC converter when the DC/DC converter is connected to the DC/AC converter, the switching apparatus 300 further includes a first one-way switch D1 connected between the first output end of the switching unit 301 and the first DC/AC converter and a second one-way switch D2 connected between the second output end of the switching unit 301 and the second DC/AC converter.

Figure 6:
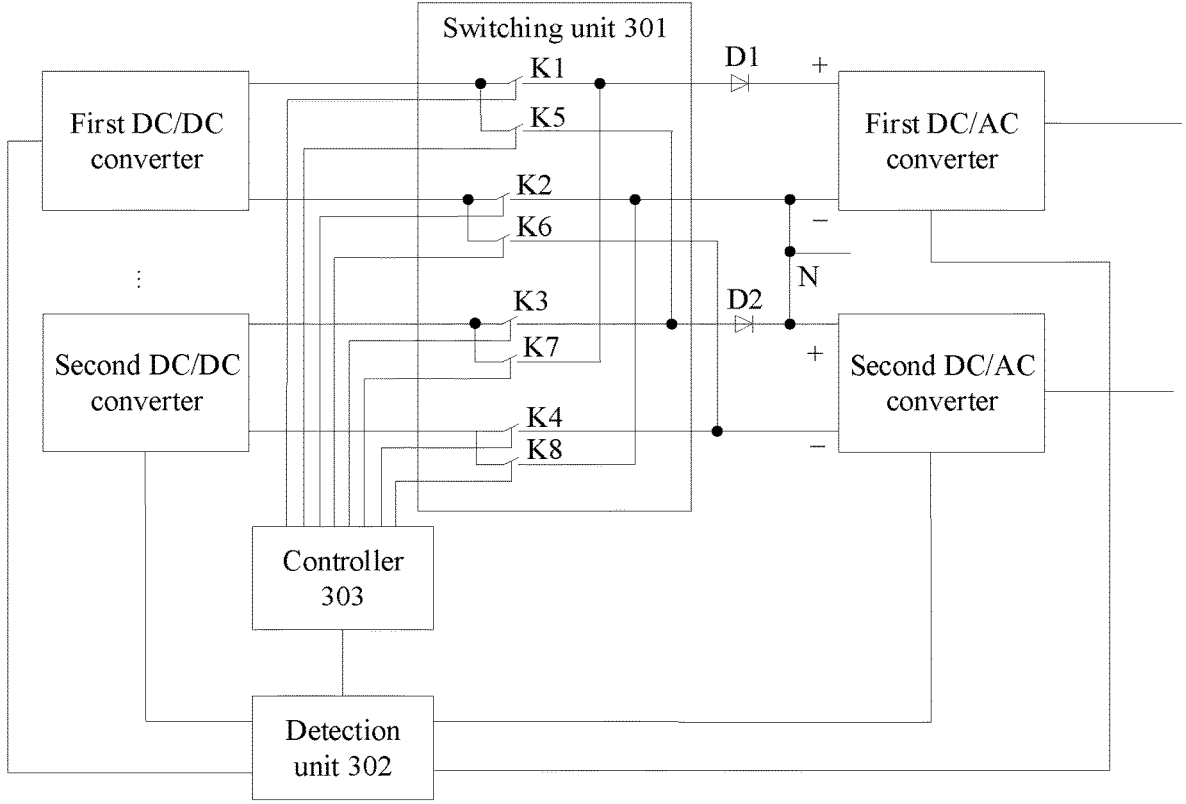
FIG. 6 is a schematic diagram 3 of a structure of a switching unit according to an embodiment of this application.

Specifically, refer to FIG. 6. The controller 303 is further connected to each first DC/DC converter and each second DC/DC converter. The controller 303 may be further configured to, when it is determined that a difference between an output voltage of each first DC/DC converter or an output voltage of each second DC/DC converter and a preset voltage threshold is greater than a preset voltage difference threshold, adjust the output voltage of each first DC/DC converter and/or the output voltage of each second DC/DC converter. The one-way switch may be a diode.

Example 2 of the Switching Unit 301

Figure 7:
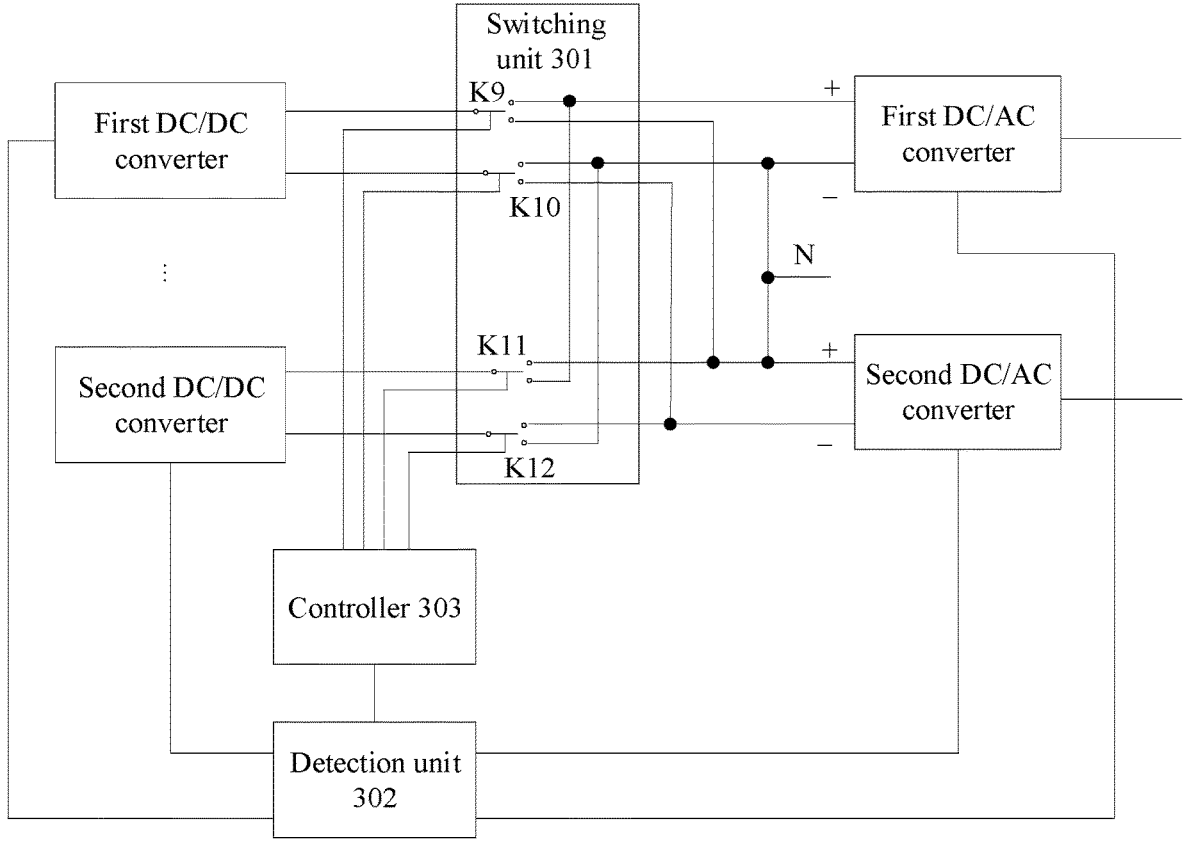
FIG. 7 is a schematic diagram 4 of a structure of a switching unit according to an embodiment of this application.

In the switching apparatus 300 provided in this embodiment of this application, as shown in FIG. 7, the plurality of switches in the switching unit 301 include: a first single-pole double-throw switch K9 that is in a one-to-one correspondence with each first input end of the switching unit 301, a second single-pole double-throw switch K10 that is in a one-to-one correspondence with each first input end of the switching unit 301, a third single-pole double-throw switch K11 that is in a one-to-one correspondence with each second input end of the switching unit 301, and a fourth single-pole double-throw switch K12 that is in a one-to-one correspondence with each second input end of the switching unit 301.

An input end of each first single-pole double-throw switch K9 is connected to a corresponding first input end, a first output end of each first single-pole double-throw switch K9 is connected to the first endpoint of the input end of a first DC/AC converter, and a second output end of each first single-pole double-throw switch K9 is connected to the first endpoint of the input end of the second DC/AC converter. An input end of each second single-pole double-throw switch K10 is connected to a corresponding first input end, a second input end of each second single-pole double-throw switch K10 is connected to the second endpoint of the input end of the first DC/AC converter, and a second output end of each second single-pole double-throw switch K10 is connected to the second endpoint of the input end of the second DC/AC converter. An input end of each third single-pole double-throw switch K11 is connected to a corresponding second input end, a first output end of each third single-pole double-throw switch K11 is connected to the first endpoint of the input end of the second DC/AC converter, and a second output end of each third single-pole double-throw switch K11 is connected to the first endpoint of the input end of the first DC/AC converter. An input end of each fourth single-pole double-throw switch K12 is connected to a corresponding second input end, a first output end of each fourth single-pole double-throw switch K12 is connected to the second endpoint of the input end of the second DC/AC converter, and a second output end of each fourth single-pole double-throw switch K12 is connected to the second endpoint of the input end of the first DC/AC converter.

The input end of each second single-pole double-throw switch K10 is connected to a corresponding second input end, a first output end of each second single-pole double-throw switch K10 is connected to the second DC/AC converter, and the second output end of each second single-pole double-throw switch K10 is connected to the first DC/AC converter. The first output end of each second single-pole double-throw switch K10 is separately connected in series to the second output end of each first single-pole double-throw switch K9 and the second output end of each fourth single-pole double-throw switch K12 through the neutral point, and the second output end of each third single-pole double-throw switch K11 is separately connected in series to the second output end of the fourth single-pole double-throw switch K12 and the second output end of each first single-pole double-throw switch K9 through the neutral point.

A function of setting the first single-pole double-throw switch K9 and the second single-pole double-throw switch K10 that are corresponding to each first input end is: controlling a connection between each first DC/DC converter and the first DC/AC converter and a connection between each first DC/DC converter and the second DC/AC converter. A function of setting the third single-pole double-throw switch K11 and the fourth single-pole double-throw switch K12 is: controlling a connection between each second DC/DC converter and the second DC/AC converter and a connection between each second DC/DC converter and the first DC/AC converter.

During specific implementation, the single-pole double-throw switch has three working states: throwing up, throwing down, and opening. When the single-pole double-throw switch is in the throwing up state, the input end of the single-pole double-throw switch is connected to the first output end; when the single-pole double-throw switch is in the throwing down state, the input end of the single-pole double-throw switch is connected to the second output end; or when the single-pole double-throw switch is in the opening state, the input end of the single-pole double-throw switch is not connected to the first output end or the second output end.

Specifically, the controller 303 may send a first control signal to the first single-pole double-throw switch K9 and the second single-pole double-throw switch K10, to control the first single-pole double-throw switch K9 and the second single-pole double-throw switch K10 to be in a throwing up state. In this case, the first DC/DC converter is connected to the first DC/AC converter. The controller 303 may send a second control signal to the first single-pole double-throw switch K9 and the second single-pole double-throw switch K10, to control the first single-pole double-throw switch K9 and the second single-pole double-throw switch K10 to be in a throwing down state. In this case, the first DC/DC converter is connected to the second DC/AC converter. The controller 303 may send a third control signal to the first single-pole double-throw switch K9 and the second single-pole double-throw switch K10, to control the first single-pole double-throw switch K9 and the second single-pole double-throw switch K10 to be in an opening state. In this case, the first DC/DC converter is disconnected from the first DC/AC converter and the second DC/AC converter.

In actual use, to avoid impact of voltage inconsistency on a component when the DC/DC converter is connected to the DC/AC converter, the switching apparatus 300 further includes the first one-way switch D1 connected between the first output end of the switching unit 301 and the first DC/AC converter and the second one-way switch D2 connected between the second output end of the switching unit 301 and the second DC/AC converter.

Figure 8:
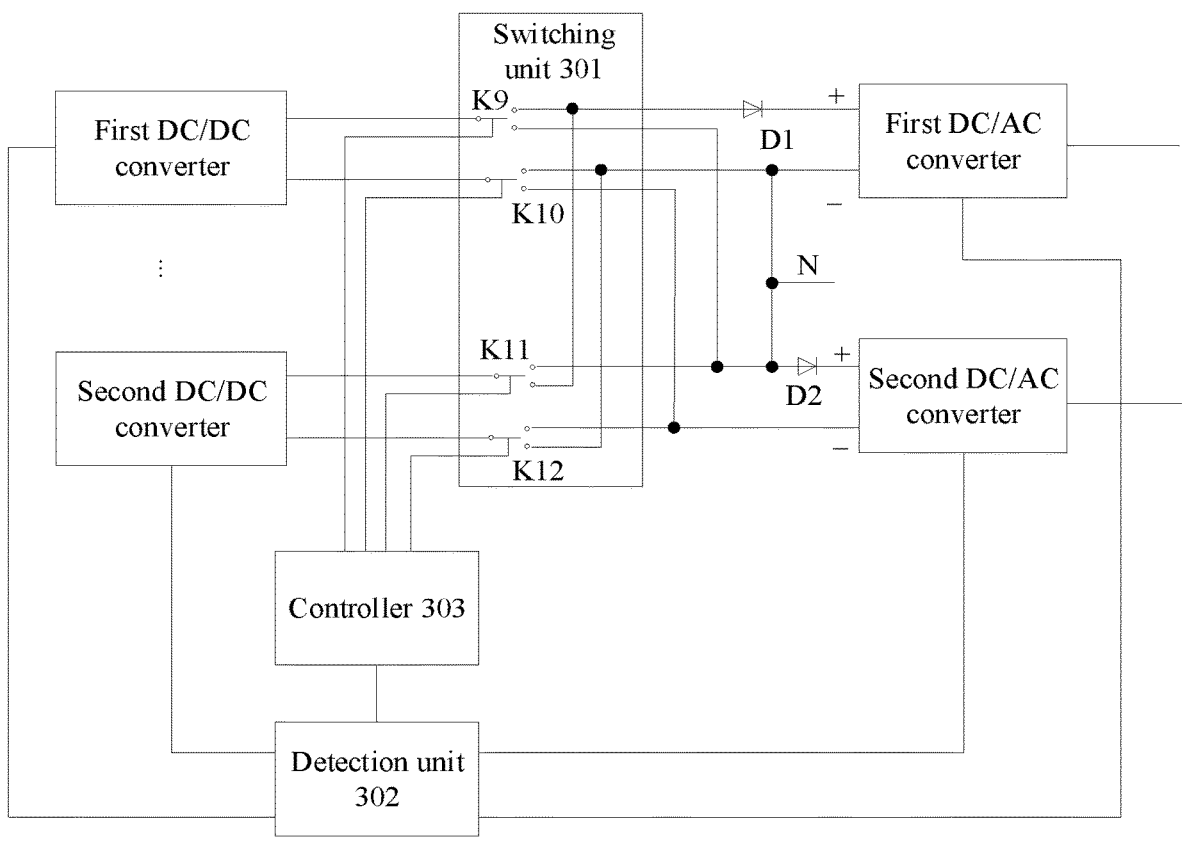
FIG. 8 is a schematic diagram 5 of a structure of a switching unit according to an embodiment of this application.

Specifically, refer to FIG. 8. The controller 303 is further connected to each first DC/DC converter and each second DC/DC converter. The controller 303 may be further configured to, when it is determined that a difference between an output voltage of each first DC/DC converter or an output voltage of each second DC/DC converter and a preset voltage threshold is greater than a preset voltage difference threshold, adjust the output voltage of each first DC/DC converter and/or the output voltage of each second DC/DC converter. The one-way switch may be a diode.

Figure 9:
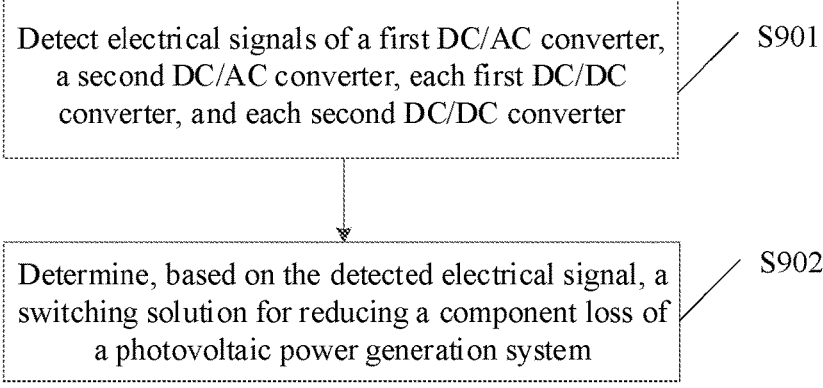
FIG. 9 is a schematic flowchart of a photovoltaic power generation system control method according to an embodiment of this application.

Specifically, the controller 303 may perform a switching manner control solution shown in FIG. 9 to control a connection between a DC/DC converter and a DC/AC converter, to reduce component losses of a photovoltaic power generation system in various running states. The following steps are mainly included.

S901: Detect electrical signals of a first DC/AC converter, a second DC/AC converter, each first DC/DC converter, and each second DC/DC converter.

In an example, the electrical signals of the first DC/AC converter, the second DC/AC converter, each first DC/DC converter, and each second DC/DC converter may be directly obtained from a monitoring system of the photovoltaic power generation system.

S902: Determine, based on the detected electrical signal, a switching solution for reducing a component loss of the photovoltaic power generation system. The switching solution is used to control a connection between each of the first DC/DC converter and the second DC/DC converter and the first DC/AC converter or the second DC/AC converter.

In a possible design, when the switching solution for reducing the component loss of the photovoltaic power generation system is determined based on the detected electrical signal, when it is determined that a second difference between an absolute value of an input voltage of the first DC/AC converter and an absolute value of an input voltage of the second DC/AC converter exceeds a preset threshold, and an absolute value of an input voltage of a second target DC/AC converter exceeds a preset voltage interval, it is determined that the switching solution is disconnecting the second target DC/AC converter from the DC/DC converter.

In a possible design, when the switching solution for reducing the component loss of the photovoltaic power generation system is determined based on the detected electrical signal, when it is determined that the second difference between the absolute value of the input voltage of the first DC/AC converter and the absolute value of the input voltage of the second DC/AC converter exceeds the preset threshold, and both the absolute value of the input voltage of the first DC/AC converter and the absolute value of the input voltage of the second DC/AC converter are within the preset voltage interval, if the absolute value of the input voltage of the first DC/AC converter is greater than the absolute value of the input voltage of the second DC/AC converter, it is determined that the switching solution is controlling a second part of a plurality of DC/DC converters connected to a first target DC/AC converter to be connected to the second DC/AC converter. If the absolute value of the input voltage of the first DC/AC converter is less than the absolute value of the input voltage of the second DC/AC converter, it is determined that the switching solution is controlling a second part of a plurality of DC/DC converters connected to the second DC/AC converter to be connected to an input end of the first DC/AC converter.

In a possible design, when the switching solution for reducing the component loss of the photovoltaic power generation system is determined based on the detected electrical signal, input electrical signals and output electrical signals of each first DC/DC converter and each second DC/DC converter may be calculated; and when it is determined that a difference between a value of an input electrical signal and a value of an output electrical signal of a first target DC/DC converter is greater than a second preset power threshold, it is determined that the switching solution is disconnecting the first target DC/DC converter from the first DC/DC converter and the second DC/AC converter.

In a possible design, when the switching solution for reducing the component loss of the photovoltaic power generation system is determined based on the detected electrical signal, when it is determined that an input electrical signal or an output electrical signal of a second target DC/DC converter exceeds a preset interval, the second target DC/DC converter is disconnected from the first DC/DC converter and the second DC/AC converter.

In a possible design, when the switching solution for reducing the component loss of the photovoltaic power generation system is determined based on the detected electrical signal, when it is determined that a sum of output power of the connected first DC/DC converter and the second DC/DC converter is less than or equal to a target threshold, it is determined that the switching solution is controlling the connected DC/DC converter to be connected to the first DC/AC converter or the second DC/AC converter. The target threshold is rated power of the first DC/AC converter or the second DC/AC converter.

In a possible design, when the switching solution for reducing the component loss the photovoltaic power generation system is determined based on the detected electrical signal, when it is determined, based on the electrical signal detected by the detection unit, that a third target DC/AC converter is faulty, it is determined that the switching solution is disconnecting the third target DC/AC converter from the DC/DC converter.

In a possible design, when the switching solution for reducing the component loss of the photovoltaic power generation system is determined based on the detected electrical signal, when it is determined, based on the electrical signals detected by a detection unit, that the third target DC/AC converter is faulty, it is determined that the switching solution is connecting the DC/DC converter connected to the third target DC/AC converter to another DC/AC converter in the photovoltaic power generation system.

It can be learned from the foregoing embodiment that, based on the switching apparatus provided in this embodiment of this application, when determining, based on the electrical signal detected by the detection unit 302, that the DC/DC converter is faulty, the photovoltaic power generation system is lightly loaded, or the like, the controller 303 may disconnect the faulty DC/DC converter or switch connections of some DC/DC converters, thereby reducing a loss of the photovoltaic power generation system and improving efficiency of the photovoltaic power generation system.

Figure 10:
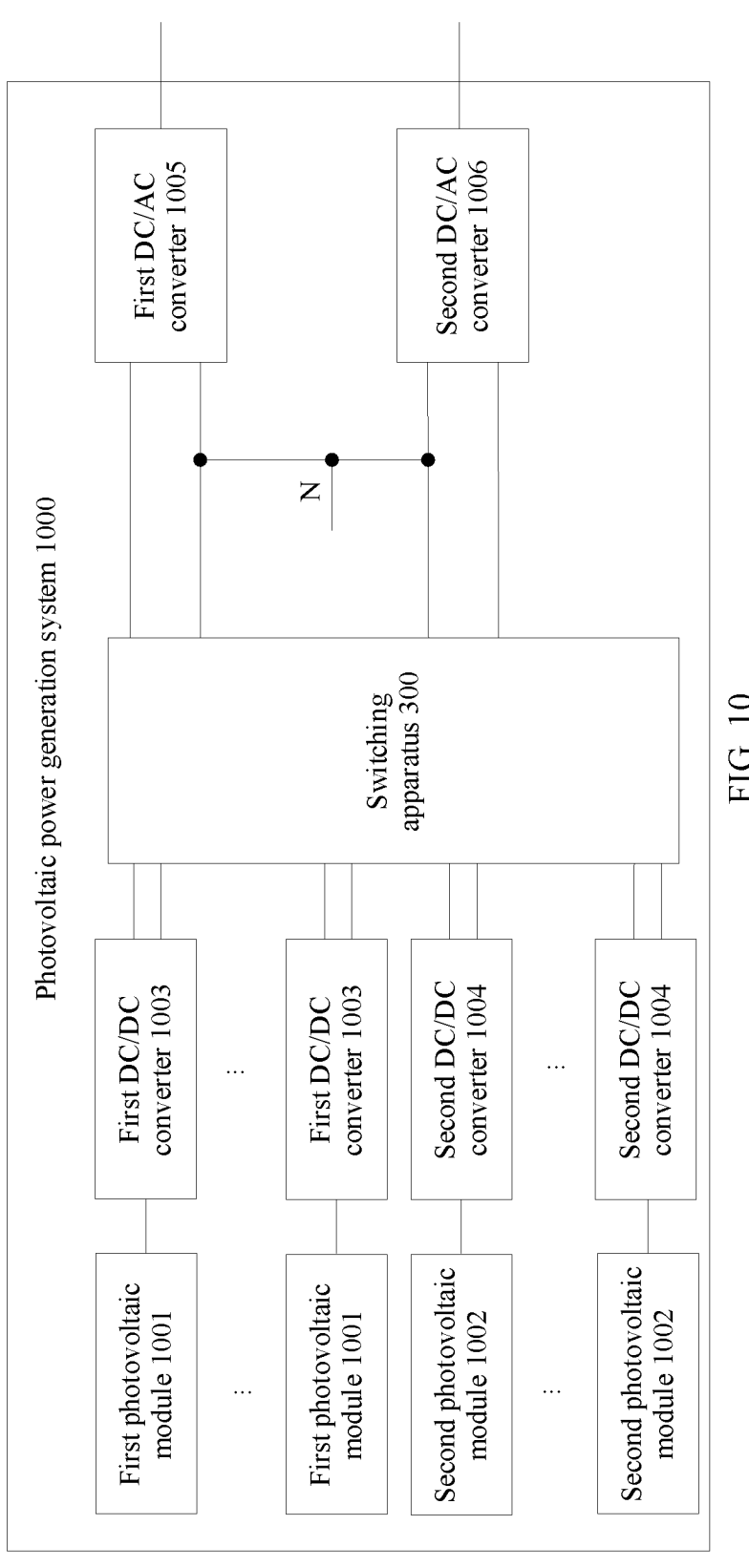
FIG. 10 is a schematic diagram of a structure of a photovoltaic power generation system according to an embodiment of this application.

Based on a same disclosure concept, an embodiment of this application further provides a photovoltaic power generation system. Refer to FIG. 10. The photovoltaic power generation system 1000 includes a plurality of first photovoltaic modules 1001, a plurality of second photovoltaic modules 1002, a first DC/DC converter 1003 that is in a one-to-one correspondence with each first photovoltaic module, a second DC/DC converter 1004 that is in a one-to-one correspondence with each second photovoltaic module, a first DC/AC converter 1005, a second DC/AC converter 1006, and the foregoing switching apparatus 300.

The first photovoltaic module 1001 is connected to a corresponding first DC/DC converter 1003; the second photovoltaic module 1002 is connected to a corresponding second DC/DC converter 1004; the first DC/DC converter 1003 and each second DC/DC converter 1004 are connected to the switching apparatus 300; and the switching apparatus is separately connected to the first DC/AC converter 1005 and the second DC/AC converter 1006.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact-disc read-only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A switching apparatus, applied to a photovoltaic power generation system, wherein the switching apparatus comprises:

a switching device comprising:

a first output end configured to connect to an input end of a first direct-current/alternating current (DC/AC) converter of the photovoltaic power generation system;

a second output end configured to connect to an input end of a second DC/AC converter of the photovoltaic power generation system;

a first plurality of input ends configured to connect to a first plurality of direct-current/direct current (DC/DC) converters of the photovoltaic power generation system in a one-to-one correspondence; and a second plurality of input ends configured to connect to a second plurality of DC/DC converters of the photovoltaic power generation system in a one-to-one correspondence, wherein the switching device is configured to:

control a connection between each of the first plurality of DC/DC converters and the first DC/AC converter; and control a connection between each of the second plurality of DC/DC converters and the second DC/AC converter;

a detector separately configured to connect to the first DC/AC converter, the second DC/AC converter, each of the first plurality of DC/DC converters, and each of the second plurality of DC/DC converters, wherein the detector is configured to:

detect electrical signals of the first DC/AC converter, the second DC/AC converter, the plurality of first DC/DC converters, and the plurality of second DC/DC converters; and output the electrical signals;

a first one-way switch configured to connect between the first output end of the switching device and the first DC/AC converter;

a second one-way switch configured to connect between the second output end of the switching device and the second DC/AC converter; and a controller separately configured to connect to the detector and the switching device, wherein the controller is configured to:

receive the electrical signals from the detector;

determine, based on the electrical signals, a switching solution for reducing a component loss of the photovoltaic power generation system; and system;

control the switching device to perform the switching solution;

connect to each first DC/DC converter and each second DC/DC converter;

adjust, when a difference between an output voltage of each first DC/DC converter and a preset voltage threshold is greater than a preset voltage difference threshold, the output voltage of each first DC/DC converter; and adjust, when a difference between an output voltage of each second DC/DC converter and the preset voltage threshold is greater than the preset voltage difference threshold, the output voltage of each second DC/DC converter.

2. The switching apparatus of claim 1, wherein the switching device further comprises a plurality of switches separately configured to connect between the first plurality of DC/DC converters and the first DC/AC converter and configured to connect between the second plurality of DC/DC converters and the second DC/AC converter, wherein the controller is configured to connect to the plurality of switches, and wherein the controller controls working states of different switches in the plurality of switches to perform the switching solution.

3. The switching apparatus of claim 2, wherein the plurality of switches comprises:

a first plurality of switches that is in a one-to-one correspondence with each of the first plurality of input ends, wherein each of the first plurality of switches comprises:

a first switch input end connected to a first endpoint of a corresponding first input end; and a first switch output end configured to connect to a first endpoint of the input end of the first DC/AC converter;

a second plurality of switches that is in a one-to-one correspondence with each of the first plurality of input ends, wherein each of the second plurality of switches comprises:

a second switch input end connected to a second endpoint of a corresponding first input end; and a second switch output end configured to connect to a second endpoint of the input end of the first DC/AC converter;

a third plurality of switches that is in a one-to-one correspondence with each of the second plurality of input ends, wherein each of the third plurality of switches comprises:

a third switch input end connected to a first endpoint of a corresponding second input end; and a third switch output end configured to connect to a first endpoint of the input end of the second DC/AC converter; and a fourth plurality of switches that is in a one-to-one correspondence with each of the second plurality of input ends, wherein each of the fourth plurality of switches comprises:

a fourth switch input end connected to a second end-point of a corresponding second input end; and a fourth switch output end configured to connect to a second endpoint of the input end of the second DC/AC converter, wherein the second switch output end is connected in series to the third switch output end through a neutral point, and wherein the input end of the first DC/AC converter is configured to connect to the input end of the second DC/AC converter through the neutral point.

4. The switching apparatus of claim 2, wherein the plurality of switches further comprises:

a fifth plurality of switches that is in a one-to-one correspondence with each of the first plurality of input ends, wherein each of the fifth plurality of switches comprises:

a fifth switch input end connected to a first endpoint of a corresponding first input end; and a fifth switch output end configured to connect to the first endpoint of the input end of the second DC/AC converter;

a sixth plurality of switches that is in a one-to-one correspondence with each of the first plurality of input ends, wherein each of the sixth plurality of switches comprises:

a sixth switch input end connected to a second endpoint of a corresponding first input end; and a sixth switch output end configured to connect to the second endpoint of the input end of the second DC/AC converter;

a seventh plurality of switches that is in a one-to-one correspondence with each of the second plurality of input ends, wherein each of the seventh plurality of switches comprises:

a seventh switch input end connected to a first endpoint of a corresponding second output end; and a seventh switch output end configured to connect to the first endpoint of the input end of the first DC/AC converter; and an eighth plurality of switches that is in a one-to-one correspondence with each of the second plurality of input ends, wherein each of the eighth plurality of switches comprises:

an eighth switch input end connected to a second endpoint of a corresponding second input end; and an eighth switch output end configured to connect to the second endpoint of the input end of the first DC/AC converter, wherein the sixth switch output end is connected in series to the seventh switch output end through a neutral point, wherein the input end of the first DC/AC converter is configured to connect to the input end of the second DC/AC converter through the neutral point, and wherein the switching device is further configured to:

control a connection between each first DC/DC converter and the second DC/AC converter; and control a connection between each second DC/DC converter and the first DC/AC converter.

5. The switching apparatus of claim 2, wherein the plurality of switches further comprises:

a first single-pole double-throw (SPDT) switch that is in a one-to-one correspondence with each of the first plurality of input ends, wherein the first SPDT switch comprises:

a first SPDT input end connected to a corresponding first input end;

a first SPDT output end configured to connect to a first endpoint of the input end of the first DC/AC converter; and a second SPDT output end configured to connect to a first endpoint of the input end of the second DC/AC converter;

a second SPDT switch that is in a one-to-one correspondence with each of the first plurality of input ends, wherein the second SPDT switch comprises:

a second SPDT input end connected to a corresponding first input end and connected to a corresponding second input end;

a third SPDT input end configured to connect to a second endpoint of the input end of the first DC/AC converter;

a third SPDT output end configured to connect to the second DC/AC converter; and a fourth SPDT output end configured to connect to a second endpoint of the input end of the second DC/AC converter, the fourth SPDT output end is configured to connect to the first DC/AC converter;

a third SPDT switch that is in a one-to-one correspondence with each of the second plurality of input ends, wherein the third SPDT switch comprises:

a fourth SPDT input end connected to a corresponding second input end;

a fifth SPDT output end configured to connect to the first endpoint of the input end of the second DC/AC converter; and a sixth SPDT output end configured to connect to the first endpoint of the input end of the first DC/AC converter; and a fourth SPDT switch that is in a one-to-one correspondence with each of the second plurality of input ends, wherein the fourth SPDT switch comprises:

a fifth SPDT input end connected to a corresponding second input end;

a seventh SPDT output end configured to connect to the second endpoint of the input end of the second DC/AC converter; and an eighth SPDT output end configured to connect to the second endpoint of the input end of the first DC/AC converter, wherein the third SPDT output end is separately connected in series to the second SPDT output end and the eighth SPDT output end through a neutral point, wherein the input end of the first DC/AC converter is configured to connect to the input end of the second DC/AC converter through the neutral point, and wherein the sixth SPDT output end is separately connected in series to the eighth SPDT output and the second SPDT output end through the neutral point; and wherein the switching device is further configured to:

control a connection between each first DC/DC converter and the second DC/AC converter; and control a connection between each second DC/DC converter and the first DC/AC converter.

6. The switching apparatus of claim 1, wherein the controller is further configured to:

calculate input power of the first DC/AC converter and input power of the second DC/AC converter based on the electrical signals;

determine, when at least one of the input power of the first DC/AC converter or the input power of the second DC/AC converter is less than a first preset power threshold, that the switching solution is calculating a first difference between input power of a first target DC/AC converter and the first preset power threshold, wherein input power of the first target DC/AC converter is less than the first preset power threshold; and disconnect, based on the first difference and a second preset power threshold, a first part of the first plurality of DC/DC converters connected to the first target DC/AC converter.

7. The switching apparatus of claim 6, wherein the controller is further configured to determine when a second difference between an absolute value of an input voltage of the first DC/AC converter and an absolute value of an input voltage of the second DC/AC converter exceeds a preset threshold and an absolute value of an input voltage of a second target DC/AC converter exceeds a preset voltage interval, that the switching solution is disconnecting the second target DC/AC converter from the second plurality of DC/DC converters.

8. The switching apparatus of claim 7, wherein the controller is further configured to:

determine, when the second difference between the absolute value of the input voltage of the first DC/AC converter and the absolute value of the input voltage of the second DC/AC converter exceeds the preset threshold, an absolute value of an input voltage of a third target DC/AC converter is within the preset voltage interval, and the absolute value of the input voltage of the first DC/AC converter is greater than the absolute value of the input voltage of the second DC/AC converter, that the switching solution is controlling a second part of a plurality of DC/DC converters connected to the first target DC/AC converter to be connected to the second DC/AC converter; or determine, when the absolute value of the input voltage of the first DC/AC converter is less than the absolute value of the input voltage of the second DC/AC converter, that the switching solution is controlling the second part of the plurality of DC/DC converters connected to the second DC/AC converter to be connected to the input end of the first DC/AC converter.

9. The switching apparatus of claim 1, wherein the controller is further configured to:

calculate input electrical signals and output electrical signals of each first DC/DC converter and each second DC/DC converter based on the electrical signals; and determine, when a difference between a value of an input electrical signal and a value of an output electrical signal of a first target DC/DC converter is greater than a second preset power threshold, that the switching solution is disconnecting the first target DC/DC converter from the first DC/AC converter and the second DC/AC converter.

10. The switching apparatus of claim 9, wherein the controller is further configured to determine, when an input electrical signal or an output electrical signal of a second target DC/DC converter exceeds a preset interval, that the switching solution is disconnecting the second target DC/DC converter from the first DC/AC converter and the second DC/AC converter.

11. The switching apparatus of claim 9, wherein the controller is further configured to determine, when a sum of output power of the first DC/DC converter and the second DC/DC converter is less than or equal to a target threshold, that the switching solution is controlling the first DC/DC converter and the second DC/DC converter to be connected to the first DC/AC converter or the second DC/AC converter, wherein the target threshold is rated power of the first DC/AC converter and the second DC/AC converter.

12. A photovoltaic power generation system control method comprising:

detecting electrical signals of a first direct-current/alternating-current (DC/AC) converter, a second DC/AC converter, each of a first plurality of direct-current/direct-current (DC/DC) converters, and each of a second plurality of DC/DC converters to obtain detected electrical signals; and determining, based on the detected electrical signals and when a second difference between a first absolute value of a first input voltage of the first DC/AC converter and a second absolute value of a second input voltage of the second DC/AC converter exceeds a preset threshold and a third absolute value of a third input voltage of a second target DC/AC converter exceeds a preset voltage interval, a switching solution for reducing a component loss of a photovoltaic power generation system, wherein the switching solution comprises disconnecting the second target DC/AC converter from a DC/DC converter and controls a connection between each of the first plurality of DC/DC converters and the second plurality of DC/DC converters and the first DC/AC converter or the second DC/AC converter.

13. The method of claim 12, wherein determining the switching solution for reducing the component loss of the photovoltaic power generation system comprises:

calculating first input power of the first DC/AC converter and second input power of the second DC/AC converter;

determining, when at least one of the first input power or the second input power is less than a first preset power threshold, that the switching solution is calculating a first difference between third input power of a first target DC/AC converter and the first preset power threshold, wherein the first target DC/AC converter is a DC/AC converter whose input power is less than the first preset power threshold; and disconnecting, based on the first difference and a second preset power threshold, a first part of a DC/DC converter connected to the first target DC/AC converter.

14. The method of claim 12, wherein determining the switching solution for reducing the component loss of the photovoltaic power generation system comprises:

determining, when the second difference between the first absolute value and the second absolute value exceeds the preset threshold, both the first absolute value and the second absolute value are within the preset voltage interval, and the first absolute value is greater than the second absolute value, that the switching solution is controlling a second part of a plurality of DC/DC converters connected to the first DC/AC converter to be connected to the second DC/AC converter; and determining, when the first absolute value is less than the second absolute value, that the switching solution is further comprises controlling a third part of a plurality of DC/DC converters connected to the second DC/AC converter in the photovoltaic power generation system to be connected to an input end of the first DC/AC converter.

15. The method of claim 12, wherein determining the switching solution for reducing the component loss of the photovoltaic power generation system comprises:

calculating input electrical signals and output electrical signals of each first DC/DC converter;

calculating input electrical signals and output electrical signals of each second DC/DC converter; and determining, when a difference between a value of an input electrical signal and a value of an output electrical signal of a first target DC/DC converter is greater than a second preset power threshold, that the switching solution further comprises disconnecting the first target DC/DC converter from the first DC/AC converter and the second DC/AC converter.

16. The method of claim 15, wherein determining the switching solution for reducing the component loss of the photovoltaic power generation system comprises determining, when an input electrical signal or an output electrical signal of a second target DC/DC converter exceeds a preset interval, that the switching solution further comprises disconnecting the second target DC/DC converter from the first DC/AC converter and the second DC/AC converter.

17. The method of claim 15, wherein determining the switching solution for reducing the component loss of the photovoltaic power generation system comprises determining, when a sum of output power of the first DC/DC converter and the second DC/DC converter is less than or equal to a target threshold, that the switching solution further comprises controlling the first DC/DC converter and the second DC/DC converter to be connected to the first DC/AC converter or the second DC/AC converter, wherein the target threshold is rated power of the first DC/AC converter or the second DC/AC converter.

18. The method of claim 12, wherein determining the switching solution for reducing the component loss of the photovoltaic power generation system comprises:

determining, based on the electrical signals, that a third target DC/AC converter is faulty; and determining that the switching solution further comprises disconnecting the third target DC/AC converter from a DC/DC converter of the first plurality of DC/DC converters or the second plurality of DC/DC converters.

19. A switching apparatus, applied to a photovoltaic power generation system, wherein the switching apparatus comprises:

a switching device comprising:

a first output end configured to connect to an input end of a first direct-current/alternating current (DC/AC) converter of the photovoltaic power generation system;

a second output end configured to connect to an input end of a second DC/AC converter of the photovoltaic power generation system;

a first plurality of input ends configured to connect to a first plurality of direct-current/direct current (DC/DC) converters of the photovoltaic power generation system in a one-to-one correspondence; and a second plurality of input ends configured to connect to a second plurality of DC/DC converters of the photovoltaic power generation system in a one-to-one correspondence, wherein the switching device is configured to:

control a connection between each of the first plurality of DC/DC converters and the first DC/AC converter; and control a connection between each of the second plurality of DC/DC converters and the second DC/AC converter;

a detector separately configured to connect to the first DC/AC converter, the second DC/AC converter, each of the first plurality of DC/DC converters, and each of the second plurality of DC/DC converters, wherein the detector is configured to:

detect electrical signals of the first DC/AC converter, the second DC/AC converter, the plurality of first DC/DC converters, and the plurality of second DC/DC converters; and output the electrical signals; and a controller separately configured to connect to the detector and the switching device, wherein the controller is configured to:

receive the electrical signals from the detector;

determine, based on the electrical signals, a switching solution for reducing a component loss of the photovoltaic power generation system;

control the switching device to perform the switching solution;

calculate input power of the first DC/AC converter and input power of the second DC/AC converter based on the electrical signals;

determine, when at least one of the input power of the first DC/AC converter or the input power of the second DC/AC converter is less than a first preset power threshold, that the switching solution is calculating a first difference between input power of a first target DC/AC converter and the first preset power threshold, wherein input power of the first target DC/AC converter is less than the first preset power threshold; and disconnect, based on the first difference and a second preset power threshold, a first part of the first plurality of DC/DC converters connected to the first target DC/AC converter.

20. The switching apparatus of claim 19, wherein the switching device further comprises a plurality of switches separately configured to connect between the first plurality of DC/DC converters and the first DC/AC converter and configured to connect between the second plurality of DC/DC converters and the second DC/AC converter, wherein the controller is configured to connect to the plurality of switches, and wherein the controller controls working states of different switches in the plurality of switches to perform the switching solution.

* * * * *